(12) United States Patent
Sandstrom

(10) Patent No.: US 7,531,596 B2
(45) Date of Patent: May 12, 2009

(54) RUBBER COMPOSITION CONTAINING ANTIDEGRADANT AND MIBK ADSORBING ACTIVATED CARBON, AND PNEUMATIC TIRE WITH COMPONENT

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/606,675

(22) Filed: Nov. 30, 2006

(65) Prior Publication Data

US 2008/0128060 A1 Jun. 5, 2008

(51) Int. Cl.
*C08K 3/04* (2006.01)
*C08G 18/66* (2006.01)
*B60C 13/00* (2006.01)

(52) U.S. Cl. .......... 524/495; 524/356; 152/525

(58) Field of Classification Search ............ 524/356, 524/495; 152/525
See application file for complete search history.

(56) References Cited

U.S. PATENT DOCUMENTS

| | | | |
|---|---|---|---|
| 2,083,303 A | 6/1937 | Krezil | 252/3 |
| 2,508,474 A | 5/1950 | Slyh et al. | 252/422 |
| 4,078,001 A * | 3/1978 | Summers | 564/305 |
| 5,206,207 A | 4/1993 | Tolles | 502/424 |
| 5,212,144 A | 5/1993 | Schwartz, Jr. | 502/423 |
| 5,244,028 A * | 9/1993 | Segatta et al. | 152/525 |
| 5,250,491 A | 10/1993 | Yan | 502/424 |
| 5,538,932 A * | 7/1996 | Yan et al. | 502/424 |
| 6,060,424 A * | 5/2000 | Alford | 502/416 |
| 6,337,302 B1 | 1/2002 | Teng et al. | 502/432 |
| 6,696,384 B2 | 2/2004 | McCrae et al. | 502/180 |
| 6,863,713 B1 | 3/2005 | Ghosal et al. | 95/117 |
| 2001/0022957 A1* | 9/2001 | Subbanna et al. | 423/484 |
| 2004/0159386 A1* | 8/2004 | Deevers et al. | 152/503 |
| 2004/0192825 A1* | 9/2004 | Zanzig et al. | 524/492 |
| 2005/0035062 A1* | 2/2005 | Hiltzik et al. | 210/660 |
| 2005/0220989 A1* | 10/2005 | Chaturvedi et al. | 427/122 |
| 2006/0183812 A1* | 8/2006 | Miller et al. | 523/102 |

FOREIGN PATENT DOCUMENTS

JP 10324118 A * 12/1998

* cited by examiner

*Primary Examiner*—Katarzyna Wyrozebski
*Assistant Examiner*—Angela C Scott
(74) *Attorney, Agent, or Firm*—Henry C. Young, Jr.

(57) ABSTRACT

The present invention relates to a rubber composition containing a diene based elastomer reinforced with rubber reinforcing carbon black and/or silica which contains an antidegradant comprised of N-1,3-dimethylbutyl-N'-phenyl-p-phenylene diamine (6-PPD) together with a dispersion of a methyl isobutyl ketone (MIBK)-adsorbing activated carbon. The invention further relates to a tire having a component thereof containing such rubber composition.

1 Claim, No Drawings

US 7,531,596 B2

RUBBER COMPOSITION CONTAINING ANTIDEGRADANT AND MIBK ADSORBING ACTIVATED CARBON, AND PNEUMATIC TIRE WITH COMPONENT

FIELD OF THE INVENTION

The present invention relates to a rubber composition containing a diene based elastomer reinforced with rubber reinforcing carbon black and/or silica which contains an antidegradant comprised of N-1,3-dimethylbutyl-N'-phenyl-p-phenylene diamine (6-PPD) together with a dispersion of a methyl isobutyl ketone (MIBK)-adsorbing activated carbon. The invention further relates to a tire having a component thereof containing such rubber composition.

BACKGROUND OF THE INVENTION

Pneumatic rubber tires often contain internal and external rubber components which are subject to degradation by exposure to oxygen and ozone.

Virtually all tire rubber components, particularly rubber compositions containing diene-based elastomer(s) contain antidegradants to resist degradation of the elastomer(s) by exposure to oxygen and ozone, whereas the internal components are more effected by oxygen. Such tire components include both internal and external components such as, for example, a tire tread, sidewall, apex, belt rubber coat, carcass ply rubber coat, chafer and inner liner, all of which are tire components well known to those having skill in such art. The external tire components such as, for example a tire tread, sidewall and chafer require such protection against atmospheric oxygen and ozone. Such tire components are well known to those having skill in such art.

An often used antidegradant for such purpose, which is usually suitable as both an antioxidant or antiozonant (and is more simply referred to herein as an antidegradant) is comprised of N-1,3-dimethylbutyl-N'-phenyl-p-phenylene diamine (referred to herein as "6-PPD").

In one aspect, rubber sidewalls of tires may age somewhat prematurely as a result of, for example, weathering due to atmospheric conditions including ozone, oxygen and ultraviolet light exposure, particularly rubber sidewalls composed of rubber compositions which contain a diene-based elastomer.

An alternative for a tire sidewall has been to use rubber compositions for the exposed outer sidewall rubber layers which are resistant to such atmospheric degradation which contain low unsaturation elastomers such as, for example, halobutyl rubber and EPDM (ethylene/propyene/non-conjugated diene terpolymer rubber) in blends with diene-based elastomers. In this case, antidegradants such as the 6-PPD are not required but the material costs and some cured properties are not as favorable as those for sidewall rubber compositions made entirely from entirely from diene-based elastomers.

A more suitable and lower cost alternative for a tire sidewall is to use a conjugated diene-based elastomer containing the 6-PPD antidegradant in its rubber composition to provide resistance to rubber degradation due to exposure to oxygen and ozone during its continual flexing and elevated temperature generated during its operating conditions.

However, a by-product of such use of the 6-PPD is methyl isobutyl ketone (referred to herein as "MIBK"), a phenomenon well known by those having skill in such art.

Liberation of the MIBK by-product typically occurs during one or more of mixing of the rubber composition at an elevated temperature, the curing of the rubber composition in a suitable mold at an elevated temperature or use of an article of manufacture (e.g. tire) containing a component of such rubber composition over time under continual flexing conditions and atmospheric exposure to oxygen and ozone.

An important aspect of this invention is an inclusion of a dispersion of an MIBK-adsorbing particulate activated carbon in the rubber composition for adsorption of the resultant MIBK by-product in situ within the rubber composition upon formation of the MIBK by-product in situ within the rubber composition.

Activated carbon, in general, can be a very versatile adsorbent for various gases and liquids in a sense that the size and density of its pores can be considerably varied.

Activated carbon can be, for example, a primarily amorphous particulate form of carbon, usually a microcrystalline, non-graphitic form of carbon, having a large surface area and pore volume which can make it useful in providing adsorptive properties for adsorbing various gases and liquids. For example, its average specific surface area (BET nitrogen adsorption) may be in a range of, for example, from about 500 to about 2000 $m^2/g$ or even greater. Such surface area is of a significant magnitude greater than the average nitrogen adsorption (BET) surface area in a range of, for example, from about 8 to about 150 $m^2/g$ for typical rubber reinforcing carbon blacks and therefore considered herein as being exclusive of such rubber reinforcing carbon blacks.

Commercial grades of activated carbon are often referred to as being gas-phase and liquid-phase adsorbents although the adsorbent abilities may somewhat overlap each other depending upon a particular activated carbon and intended gas and/or liquid to be adsorbed.

Generally, the larger the surface area of the activated carbon, the greater its adsorption capacity with the available surface area of the activated carbon being somewhat dependent upon its pore volume.

Therefore a large surface area may be promoted, for example, by:

(A) maximizing the number of pores of very small dimensions and/or (B) minimizing the number of pores of very large dimensions.

The pores are often referred to in the sense of their sizes by the International Union of Pure and Applied Chemistry as "micropores", "mesopores" and "macropores".

Micropores are referred to as having a pore width of less than 1.8 nm, mesopores having a pore width of from 1.8 to 50 nm and macropores having a pore width of greater than 50 nm. It is the presence and pore size distribution of the micropores and mesopores which are considered to contribute to the adsorptive capacity of the activated carbon. For example, a relatively high pore volume percentage of mesopores (e.g. above 50 percent of the total pore volume) is generally desirable.

Various raw materials may be used as a source for the carbon by carbonizing and then activation such as, for example and not intended to be limited, wood chips, sawdust, lignite, coconut shells, coal and carbon black refuse, to name a few sources.

Various methods of preparing activated carbon may be used. For example activated carbon may be prepared by one of two distinct processes, namely, by (A) chemical activation, or (B) thermal activation.

For example, thermal activation typically involves gasification of the carbon at relatively high temperatures, after an initial carbonization of the raw material. For example, chemical activation typically involves chemical dehydration/condensation reactions at significantly lower temperatures. For example, a carbonaceous material such as a lignocellulosic material may be treated with a chemical activation agent such as, for example, phosphoric acid or zinc chloride. Such lignocellulosic material may be, for example, wood chips and/or sawdust. Various method of preparing activated carbon are well known by those having skill in such art.

Various functional groups may be also formed, if desired, during activation of the carbon, for example by interaction of free radicals on the carbon surface, to render the surface of the activated carbon chemically reactive and to thereby further influence its adsorptive abilities and properties.

Activated carbon has been commercially manufactured and marketed for many years as adsorbents for various gasses and liquids (including for, example, use in gas masks and automobile gasoline recovery canisters as well as many other uses) and therefore are well known, as well as various methods of preparation, by those having skill in such art.

Representative examples of various activated carbon as well as applications and methods of preparation may be found, for example, in U.S. Pat. Nos. 5,206,207, 5,212,144, 5,250,491, 6,337,302, 6,863,713 and 6,696,384 (using carboxy methylcellulose post treatment) as well as earlier U.S. Pat. Nos. 2,083,303 and 2,508,474.

Representative of various commercially available activated carbons for various purposes are, for example, activated carbon from the MeadWestvaco company such as, for example, WV-A900, WV-A1100, WV-A1500, BAX950, BAX1100 and BAX1500; activated carbon from the Carbochem Company such as, for example CARBOCHEM™ GS-75, GL80, VP-50, LP-30, DC-50, DC-40, LQ-900, LQ-1000, LQ900S, LQ-1240 and CA-10; activated carbon and activated carbon families from the Calgon Carbon Corporation as, for example, Ventsorb™, Vapor Pac™, Cal™, Cane Cal™, CPG™, Filtrasorb™, GW™, MRX™, and WPL-WPH™.

For this invention, it is considered herein that the preparation and use of an activated carbon suitable for adsorbing MIBK, (e.g. having a suitable combination of surface area and pore size distribution) can be accomplished by a person skilled in the art of activated carbon preparation without undue experimentation.

In practice, it is considered herein that the use of a dispersion of an MIBK-adsorbing activated carbon in a rubber composition containing at least one diene-based elastomer and said N-1,3-dimethylbutyl-N'-phenyl-p-phenyhlene diamine (PPD) from which the MIBK by-product is formed, to thereby adsorb said MIBK by-product is novel and a significant departure from past practice, particularly for a tire component of such rubber composition.

While the mechanism may not be fully understood, an important aspect of the invention is for the inclusion of the dispersion of the particulate MIBK-adsorbing activated carbon filler which can adsorb such MIBK by-product and thereby retard or substantially inhibit such MIBK by-product from atmospheric evolution.

In the description of this invention, the term "phr" is used to designate parts by weight of an ingredient per 100 parts of elastomer, including the butyl rubber, unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention a rubber composition is provided which is comprised of a diene based elastomer composition (particularly a conjugated diene-based elastomer) which contains an antidegradant comprised of N-1,3-dimethylbutyl-N'-phenyl-p-phenylene diamine antioxidant (6-PPD) and further contains a dispersion of methyl isobutyl ketone (MIBK)-adsorbing particulate activated carbon.

In further accordance with this invention, said rubber composition further contains methyl isobutyl ketone (MIBK), namely the MIBK by-product, wherein at least a portion of said MIBK is adsorbed by said MIBK-adsorbing activated carbon, in situ within the rubber composition.

In additional accordance with this invention a tire is provided having a component comprised of said rubber composition.

In further accordance with this invention said tire component is an internal or external component.

For example, said tire component is selected from at least one of a tire tread, sidewall, belt ply rubber coat, carcass ply rubber coat, apex and chafer, particularly an external, atmospherically exposed component selected from at least one of a tire tread, sidewall and chafer.

In further accordance with this invention, a method is provided which comprises blending an MIBK-adsorbing particulate activated carbon and an antidegradant comprised of 6-PPD with a rubber composition containing at least one conjugated diene-based elastomer;

wherein said 6-PPD liberates a by-product comprised of MIBK, and wherein said MIBK-adsorbing activated carbon adsorbs at least a portion of said MIBK by-product.

In further accordance with this invention a process of providing a pneumatic rubber tire comprises:

(A) forming a rubber composition comprised of at least one conjugated diene based elastomer, an antidegradant comprised of 6-PPD, and a dispersion of a MIBK-adsorbing particulate activated carbon;

(B) processing said rubber composition at an elevated temperature (e.g. by extrusion, gear pump processing or calendering) to form an uncured rubber tire component;

(C) building and shaping a tire assembly containing said uncured rubber tire component;

(D) inserting said tire assembly in a suitable mold and curing said tire assembly in said mold at an elevated temperature; and (E) removing the cured tire assembly from said mold;

wherein said 6-PPD forms a by-product during said process and/or curing step comprised of MIBK, and wherein said MIBK-adsorbing activated carbon adsorbs at least a portion of said MIBK by-product in situ within said rubber composition.

The following Examples are provided to further illustrate the invention. The parts and percentages are by weight unless otherwise indicated.

EXAMPLE I

A prospective exemplary illustrative carbon black reinforced rubber composition for use as a rubber sidewall of a tire which contains an antidegradant comprised of N-1,3- dimethylbutyl-N'-phenyl-p-phenylene diamine (6-PPD), together with a dispersion of an MIBK-adsorbing particulate activated carbon can be prepared by mixing the ingredients in an internal rubber mixer and referred to herein as Sample A. The ingredients can be mixed in at least one sequential, non-productive, mixing stage followed by a productive mixing stage in which sulfur curative(s) are added. The proposed ingredients are illustrated in the following Table 1.

TABLE 1

| Material | Sample A |
|---|---|
| Non-Productive Mixing (NP-1) | |
| | |
| Natural cis 1,4-polyisoprene rubber[1] | 40 |
| Cis 1,4-polybutadiene rubber[2] | 60 |
| Carbon black[3] | 45 |
| Zinc oxide | 3 |
| Fatty acid[4] | 2 |
| Antidegradant[5] | 4 |
| MIBK-adsorbing activated carbon | 3 |
| Productive mixing (PR) | |
| | |
| Sulfur | 2 |
| Accelerators (curing aids)[6] | 1.5 |

[1]Natural cis 1,4-polyisoprene rubber (SMR-20)
[2]Cis 1,4-polybutadiene rubber as BUD 1207 ™ from the Goodyear Tire & Rubber Company
[3]Rubber reinforcing carbon black as N330, an ASTM designation
[4]Primarily stearic acid
[5]Comprised of N-1,3-dimethylbutyl-N'-phenyl-p-phenylene diamine (6-PPD), as Santoflex 13 from the Monsanto Company.
[6]Accelerator(s) as sulfenamide and diphenyl guanidine types The rubber Sample A may be prepared by mixing the elastomers(s) together with reinforcing fillers and other rubber compounding ingredients in a non-productive mixing stage (NP-1) in an internal rubber mixer for about 4 minutes to a temperature of about 160° C. The resulting rubber composition may then be mixed in a productive mixing stage (PR) in an internal rubber mixer with sulfur curatives for about 2 minutes to a temperature of about 110° C. The rubber composition can be sheeted out and cooled to below 40° C. between the non-productive mixing and the productive mixing steps.

The rubber composition can then be extruded at an elevated temperature to form a sidewall rubber strip to be used in the following Example II.

EXAMPLE II

A prospective exemplary illustrative tubeless pneumatic rubber tire can be prepared with the sidewall rubber strip of Example II.

The green (uncured) tire can be cured in a suitable tire curing mold at a temperature of up to about 150° C. for about 18 minutes to form the vulcanized tire.

It is considered herein that the inclusion of the dispersion of the MIBK-adsorbing particulate activated carbon can absorb at least a portion of an MEBK by-product formed by a degradation of the 6-PPD antidegradant as a result of the curing, and post-ageing, of the green tire in this Example II to therefore inhibit evolution of the MIBK by-product both within the cured tire and externally from the cured tire.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a component comprised of a rubber composition comprised of a diene based elastomer composition which contains a N-1,3-dimethylbutyl-N'-phenyl-p-phenylene diamine antidegradant (6-PPD) and further contains a dispersion of methyl isobutyl ketone (MIBK)-absorbing particulate activated carbon;
   wherein said MIBK-adsorbing activated carbon is comprised of a microcrystalline, non-graphitic form of carbon having an average specific surface area determined by nitrogen adsorption of from about 500 to about 2000 $m^2/g$ and wherein at least 50 percent of the total pore volume of said isobutylene-adsorbing activated carbon is comprised of pores having a pore width of from about 1.8 to about 50 nm,
   wherein said component is an outer, atmospherically exposed sidewall rubber layer,
   wherein said rubber composition further contains methyl isobutyl ketone (MIBK), as a by-product of said 6-PPD, and
   wherein at least a portion of said MIBK is adsorbed by said MIBK-adsorbing activated carbon in situ within the rubber composition.

* * * * *